US009653804B2

(12) United States Patent
Pruett et al.

(10) Patent No.: US 9,653,804 B2
(45) Date of Patent: May 16, 2017

(54) MULTI-APERTURE ELECTRONICALLY SCANNED ARRAYS AND METHODS OF USE

(75) Inventors: James A. Pruett, Allen, TX (US); James R. Toplicar, Plano, TX (US); Paul R. Emery, Plano, TX (US); Brian L. Ball, Trenton, TX (US); John D. Carpenter, Plano, TX (US)

(73) Assignee: Raytheon Company, Waltham, MA (US)

( * ) Notice: Subject to any disclaimer, the term of this patent is extended or adjusted under 35 U.S.C. 154(b) by 1214 days.

(21) Appl. No.: 13/161,223

(22) Filed: Jun. 15, 2011

(65) Prior Publication Data
US 2012/0319901 A1 Dec. 20, 2012

(51) Int. Cl.
*H01Q 3/00* (2006.01)
*H01Q 3/26* (2006.01)
*H01Q 3/24* (2006.01)
*H04B 7/0426* (2017.01)
*H01Q 25/00* (2006.01)
*G01S 13/87* (2006.01)
*G01S 13/02* (2006.01)

(52) U.S. Cl.
CPC .............. *H01Q 3/26* (2013.01); *H01Q 3/24* (2013.01); *G01S 13/87* (2013.01); *G01S 2013/0254* (2013.01); *H01Q 25/005* (2013.01); *H04B 7/0426* (2013.01)

(58) Field of Classification Search
CPC .......... H01Q 3/24; H01Q 3/26; H01Q 25/005; H04B 7/04; H04B 7/0404; H04B 7/0408; H04B 7/0426
USPC ......................................... 342/368, 371–374
See application file for complete search history.

(56) References Cited

U.S. PATENT DOCUMENTS

| | | | |
|---|---|---|---|
| 6,515,635 B2 * | 2/2003 | Chiang et al. ................ 343/834 |
| 6,741,207 B1 * | 5/2004 | Allison .................. H01P 1/184 333/164 |
| 6,801,160 B2 * | 10/2004 | Henderson ............ H01Q 1/246 342/372 |
| 7,042,393 B1 * | 5/2006 | Konapelsky et al. ........ 342/424 |
| 7,304,605 B2 * | 12/2007 | Wells ....................... 342/357.62 |
| 7,397,425 B2 * | 7/2008 | Ranta ..................... H01Q 1/007 342/374 |
| 7,405,695 B2 * | 7/2008 | Liu .............................. 342/374 |
| 7,453,413 B2 * | 11/2008 | Larry et al. .................... 343/834 |
| 7,489,283 B2 * | 2/2009 | Ingram et al. ................ 343/853 |
| 7,671,801 B2 * | 3/2010 | Pruett et al. .................. 342/463 |
| 7,724,176 B1 * | 5/2010 | Pruett et al. ................ 342/25 R |

(Continued)

OTHER PUBLICATIONS

Wood Associates, R.A., Electronics Support Switching Unit (ESSU), R.A. Wood Associates, Engineering Solutions for Today's Industries, 1001 Broad Street, Suite 450, Utica, NY 13501; 1995-2009, 4 pages.

*Primary Examiner* — Chuong P Nguyen
(74) *Attorney, Agent, or Firm* — Daly, Crowley, Mofford & Durkee, LLP

(57) ABSTRACT

An electronically scanned array (ESA) system comprises a first ESA assembly including a first antenna system coupled to a first plurality of transmit/receive modules and a second ESA assembly including a second antenna system coupled to a second plurality of transmit/receive modules. The ESA system also includes a manifold system coupled to the first and second ESA assemblies. The manifold system including an RF signal processing system for processing signals received from the first and second ESA assemblies.

18 Claims, 6 Drawing Sheets

(56) References Cited

U.S. PATENT DOCUMENTS

| | | | |
|---|---|---|---|
| 7,791,536 B2 | 9/2010 | Brown et al. | |
| 8,035,545 B2* | 10/2011 | Pruett et al. | 342/25 R |
| 8,098,189 B1* | 1/2012 | Woodell | G01S 7/025 |
| | | | 342/188 |
| 8,334,809 B2* | 12/2012 | Nichols et al. | 343/700 MS |
| 8,427,370 B2* | 4/2013 | Pozgay | 342/372 |
| 8,773,306 B2* | 7/2014 | Milano et al. | 342/368 |
| 2003/0038748 A1* | 2/2003 | Henderson | H01Q 1/246 |
| | | | 342/373 |
| 2008/0204350 A1* | 8/2008 | Tam et al. | 343/872 |
| 2009/0027268 A1* | 1/2009 | Coward | 342/375 |
| 2010/0099370 A1* | 4/2010 | Nichols | H01Q 1/3275 |
| | | | 455/129 |
| 2010/0157531 A1* | 6/2010 | Mason et al. | 361/697 |
| 2011/0032173 A1* | 2/2011 | Chang et al. | 343/880 |
| 2013/0074520 A1* | 3/2013 | Wyatt et al. | 62/3.2 |

* cited by examiner

MULTI-APERTURE ELECTRONICALLY SCANNED ARRAYS AND METHODS OF USE

BACKGROUND

Radar systems transmit electromagnetic radiation and analyze reflected echoes of returned radiation to determine information about the presence, position, and motion of objects within a scanned area. Phased array radar systems, also known as electronically scanned arrays ("ESAs"), are a type of radar system that use multiple antennas to transmit radiofrequency (RF) signals at different relative phases. The constructive/destructive interference patterns created by the multiple signals reinforce the signal in certain directions and suppresses the signal in other directions. The phase shifting thus allows the transmitted beam of RF energy to be electronically "steered" without the need to physically move components of the radar system. Even with the electronic steering capability of an ESA, sometimes multiple ESAs may be needed to obtain an adequate field of view. The size, weight, power, and cost of using multiple ESAs may be prohibitive.

BRIEF DESCRIPTION OF THE DRAWINGS

A better understanding of the present invention will be realized from the detailed description that follows, taken in conjunction with the accompanying drawings, in which.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting.

Figure 1:
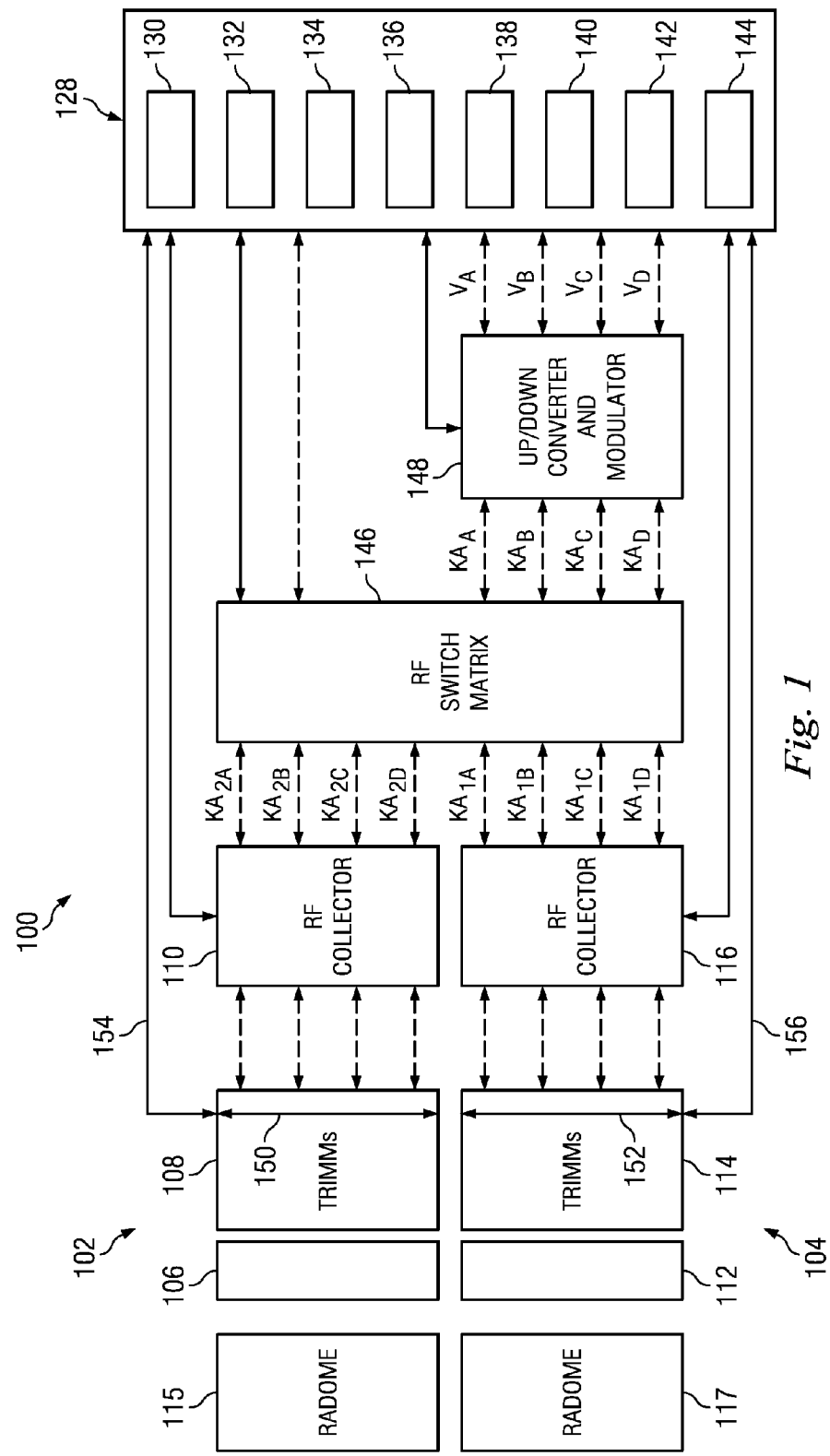
FIG. 1 is a schematic view of a multi-aperture ESA system according to one embodiment of the present disclosure.

FIG. 1 is a schematic view of a multi-aperture ESA system 100 with a shared "back end" or manifold set of support components and subsystems according to one embodiment of the present disclosure. As compared to traditional ESA systems with dedicated support systems for each aperture, the ESA system 100 may have reduced size, weight, power requirements, and cost.

The system 100 includes "front end" ESA assemblies 102, 104. ESA assembly 102 includes an antenna assembly 106 coupled to a plurality of transmit/receive modules 108. The ESA assembly 102 also includes a radiofrequency (RF) collector 110 that receives RF signals from the plurality of transmit/receive modules 108. ESA assembly 104 includes an antenna assembly 112 coupled to a plurality of transmit/receive modules 114. The ESA assembly 104 also includes an RF collector 116 that receives RF signals from the plurality of transmit/receive modules 114.

The ESA assemblies 102, 104 may be active electronically scanned arrays (AESAs) in that each of the transmit/receive modules 108 within an assembly 102, 104 may be operated at different RF frequencies and may have amplifiers and phase shifters. AESAs may be utilized in radar systems that feature short to instantaneous (millisecond) scanning rates and have a low probability of intercept. AESAs are often utilized in military applications, but are not limited to such applications. Alternatively, the ESA assemblies may be passive electronically scanned arrays (PESAs) in that the transmit/receive modules may have dedicated phase shifters but share a centralized transmitter. The ESA assemblies 102, 104 may transmit or receive in the Ka frequency band, which is approximately 27-40 GHz. In other embodiments, transmission and reception may occur in other frequency bands, for example, lower than 27 GHz or higher than 40 GHz. Such systems are often utilized in military and defense operations.

The antenna assemblies 106, 112 may utilize a plurality of elements that radiate signals with different phases to produce a beam via constructive/destructive interference. The radiating elements of the antenna assemblies 106, 112 may be flared notched radiators, monopole radiators, or other types of radiators.

The transmit/receive modules 108, 114 may include a plurality of transmit receive integrated microwave modules (TRIMMs) that include monolithic microwave integrated circuits (MMICs). The TRIMMs may include power amplifiers, attenuators, phase shifters, and other components to facilitate operation of the ESAs 102, 104. TRIMMS may be low or high power modules. TRIMMs may be built off an RF, DC, MCB, or microwave circuit board. As another example, TRIMMs may include a thermal plane or interface. A thermal plane may be bonded or otherwise coupled to the backside of a TRIMM to conduct waste heat away from the modules.

In some embodiments, the ESA assemblies 102, 104 may include more, fewer, or different components than those shown in the included figures.

The ESA assemblies 102, 104 may be exposed to gunfire, fragmentation armaments, or other environmental contaminants which can disable portions of the ESA assemblies or render them inoperable. Radome covers 115, 117 may fully or partially enclose the ESA assemblies 102, 104, respectively, to minimize transmission loss for transmitted and received electromagnetic signals while providing suitable ballistic and environmental protection for the ESA assemblies. The radome covers 115, 117 may also provide a camouflage function and/or provide a low permeation path for water vapor, thereby protecting non-hermetic electronics from humidity. The radome can also provide a controlled environment, such as a thermal environment.

The ESA assemblies 102, 104 may share a common manifold set 128 of support components and subsystems. For example, the manifold system 128 may include one or more power modules 130, including analog and/or digital power supplies, for powering components of the ESA assemblies 102, 104.

The manifold system 128 may include RF module 132. The RF module 132 may serve multiple functions including converting a digital form of a modulation waveform to an analog intermediate frequency (IF) signal. With the RF module 132, the analog IF signal may be upconverted to an RF modulated waveform. The RF module 132 may convert an RF signal to an IF signal and may digitally sample the IF signal. The RF module also performs the digital signal processing to generate sum power maps and range Doppler maps used in a digital processor to track a target.

The manifold system 128 may include a cooling module 134 that operates to remove heat from the ESA assemblies 102, 104 and the other components of the manifold system. The cooling module 134 may provide a coolant fluid, such as air or a liquid, that circulates to the ESAs and through a housing platform, such as a coldplate, of the manifold system 128.

The manifold system 128 may include one or more inertial measurement unit (IMU) modules 136 for providing rate, directional, rotational and/or acceleration measurements. For example, as the positional reference of the ESAs are distorted by movement of the vehicle and/or the supporting structure of the ESAs, the information from the IMU can be used to provide a stabilized ESA reference to compensate for the vehicle and/or supporting structure movement.

The manifold system 128 may include a beam forming module 138. The beam forming module 138 may serve to steer the beams of the ESA assemblies 102, 104 by applying weights to the signals of the transmit/receive modules 108, 114. A different combination of weights may steer the beam to a different direction. Beam forming module 138 may use any suitable analog or digital technique for generating beams.

The manifold system 128 may include a transmit processing module 140 including hardware, software, or firmware that may be used to process signals to be transmitted by the ESA assemblies 102, 104. Hardware may include computer processors and memory storage devices. Certain features of processing module 140 may be implemented using programmable logic devices such as any sort of field programmable gate array (FPGA) or other configurable gate array (CGA), application specific integrated circuit (ASIC), programmed array logic (PAL), and/or the like.

The manifold system 128 may include a receive processing module 142 including hardware, software, or firmware that may be used to process signals received by the ESA assemblies 102, 104. Certain features of processing module 142 may be implemented using programmable logic devices such as any sort of field programmable gate array (FPGA) or other configurable gate array (CGA), application specific integrated circuit (ASIC), programmed array logic (PAL), and/or the like. The processing modules 140, 142 may share hardware, software, or firmware.

The manifold system 128 may include a mounting platform 144 for coupling, housing, or otherwise supporting components 130-142. The mounting platform 144 may be installed on any of a variety of ground vehicles, aircraft, ground installations, or any other location. The mounting platform 144 may include shock absorbing features or other structures to provide protection to the mounted systems from environmental forces.

In the embodiment of FIG. 1, the system 100 includes a switch matrix 146 to selectively switch signals between a converter/modulator module 148 and either the ESA assembly 102 or the ESA assembly 104. In a first switching configuration, the switch matrix 146 may, for example, receive Ka band signals on channels A-D ($KA_{1A-1D}$) from the ESA 104 and send those channels as output channels ($KA_{A-D}$) to the converter/modulator module 148. In a second switching configuration, the switch matrix 148 may, for example, receive Ka band signals on channels A-D ($KA_{2A-2D}$) from the ESA 102 and send those channels as output channels ($KA_{A-D}$) to the converter/modulator module 148. The switch matrix 146 may receive power, control instructions, cooling fluid or other support resources from the manifold system 128. In one embodiment, the switch matrix may include a PIN diode based RF switch. In this embodiment, the PIN diode may be controlled by control systems in the manifold system 128.

The converter/modulator module 148 may convert modulated RF signals to baseband signals and/or to convert base band signals to modulated RF signals. The converter module 148 may also include analog/digital converters. As shown in FIG. 1, the converter modulator module 148 may receive the modulated $K_a$ band channels ($KA_{A-D}$) and convert/demodulate them to a baseband signal such as video signals ($V_{A-D}$) or vice versa. In some embodiments, the converter/modulator module may be incorporated into the manifold system.

The transmit/receive modules 108, 114 each include a control bus 150, 152, respectively. These control buses 150, 152 may convey timing and control signals to the TRIMMs. Direct paths 154, 156 between the ESA assemblies 102, 104 and the common manifold 128 indicate that communication, power, cooling fluid, or other resources may flow directly between the ESA assemblies and the common manifold. For example, electronic, optical, or wireless communication links, may provide timing and control information from the manifold system 128 to the transmit/receive modules 108, 114. Alternatively, timing and control signals may be sent from the manifold system to the transmit/receive modules on a common path and then may be distributed from a hub or sent serially through the transmit/receive modules. These interfaces between the ESA assemblies 102, 104 and the manifold system 128 may be protected from external environmental and handling stresses which may also contribute to reduced size, weight, power, and cost.

In use, the ESA assemblies 102, 104 operate substantially independently from each other to scan different fields of view. Each ESA assembly receives RF signals generated by the converter/modulator module 148. The modulated RF signals are switched by the switch matrix 146 to the selected ESA assembly 102 or 104 for transmission. When the echo RF signals are received by the selected ESA assembly 102 or 104, the received RF signal is sent through the switch 146 for conversion and demodulation before passing to modules in the manifold 128 for processing.

Figure 2:
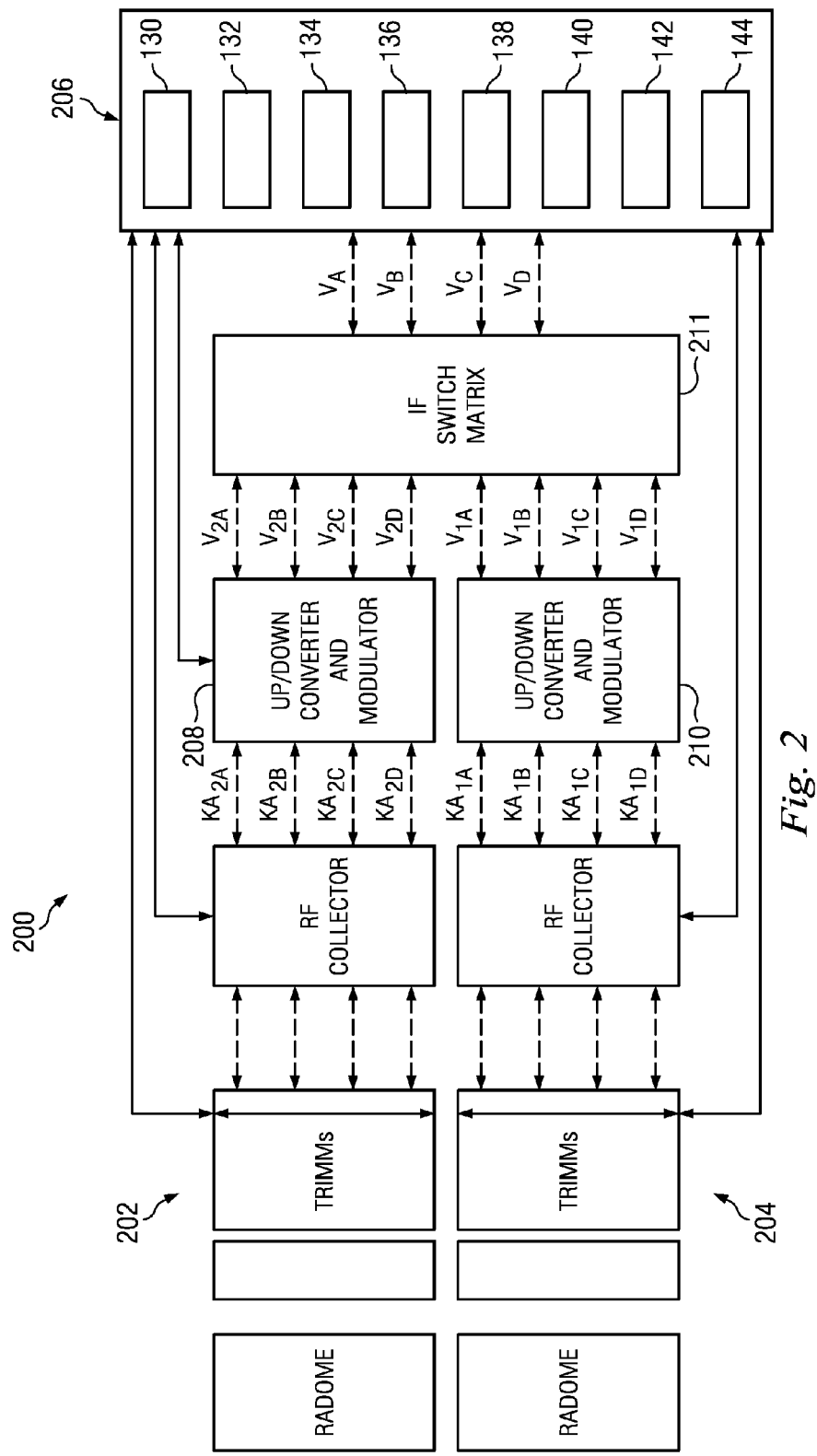
FIG. 2 is a schematic view of a multi-aperture ESA system according to another embodiment of the present disclosure.

FIG. 2 is a schematic view of a multi-aperture ESA system 200 with a shared manifold set of support components and subsystems according to another embodiment of the present disclosure. The system 200 includes ESA assemblies 202, 204 and a manifold assembly 206 that are substantially similar to the corresponding components described above for system 100. In this embodiment, a dedicated converter/modulator module 208 may be provided for ESA assembly 202, and a dedicated converter/modulator module 210 may be provided for ESA assembly 204. In this embodiment, a switch matrix may be omitted because a common converter/modulator is not shared. In this embodiment, the converter/modulator module 208 receives the modulated $K_a$ band channels ($KA_{2A-2D}$) and converts/demodulates them to a baseband signal such as video signals ($V_{2A-2D}$) for further processing by systems in the manifold assembly 206. Oppositely, the converter/modulator may also convert/modulate the video signals from the manifold 206 into the modulated $K_a$ band channels for sending to the ESA assembly 202. Converter/modulator 210 provides the same function for modulated $K_a$ band channels ($KA_{1A-1D}$) and video signals ($V_{1A-1D}$). In this embodiment, an IF switch matrix 211 may be used to selectively switch IF signals to either of the converter/modulators 208, 210.

Figure 3:
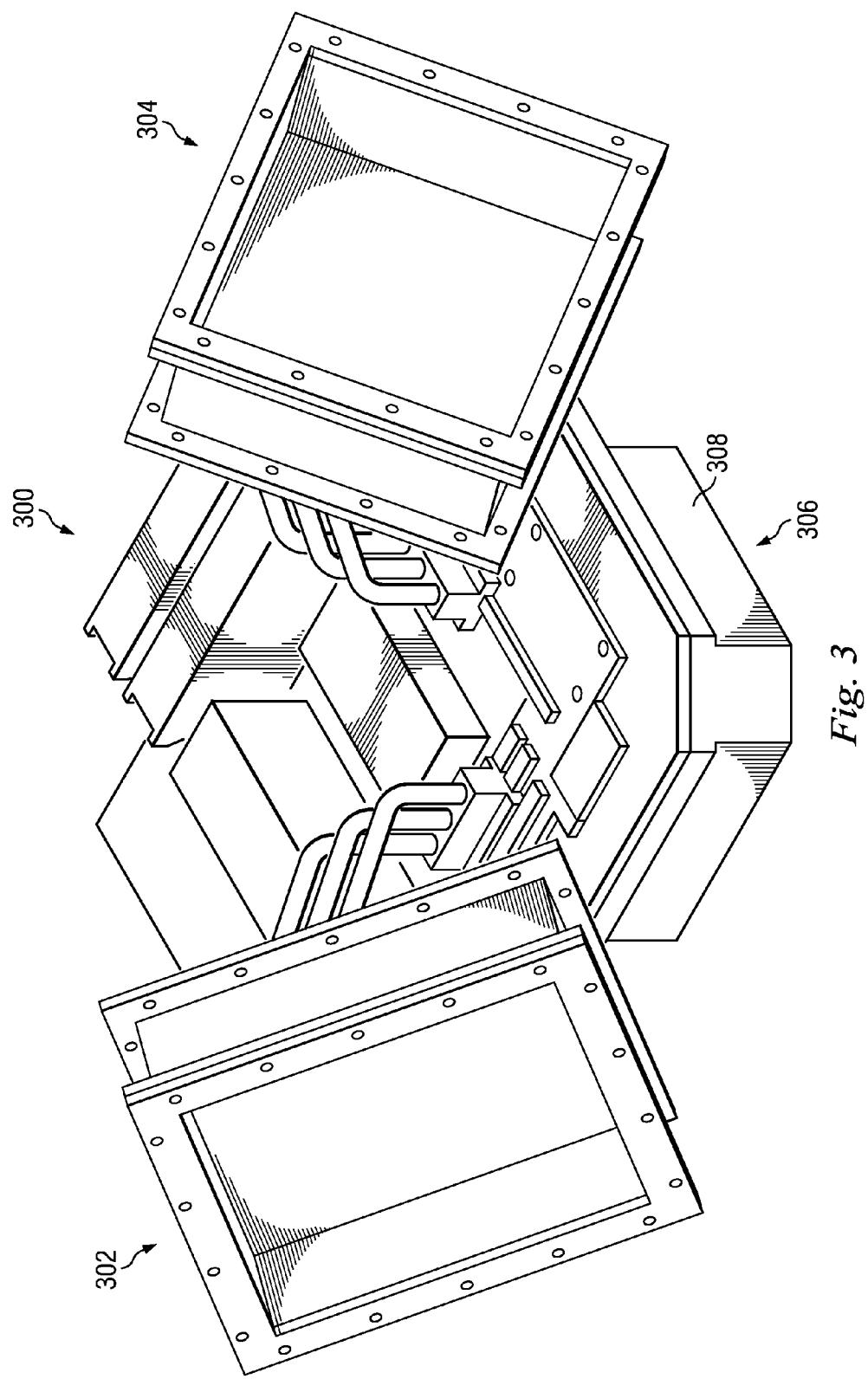
FIG. 3 is a perspective view of a two aperture ESA system according to another embodiment of the present disclosure.

FIG. 3 a perspective view of a two aperture ESA system 300 that is configured as described for system 100. The system 300 includes two ESA assemblies 302, 304 that may be substantially similar to the described ESA assemblies 102, 104. The ESA assemblies 302, 304 may be arranged to scan adjacent, overlapping, or nonadjacent fields of view. The ESA assemblies are coupled to a common manifold 306 that provides any or all of the shared resources described above for manifold 128. In this embodiment, a liquid cooled coldplate 308 is used to dissipate heat generated by the components coupled to the manifold 306, including the ESA assemblies 302, 304. As compared to a pair of ESAs, each with a dedicated RF module, a two aperture ESA system with a common RF module may have a weight reduction of approximately 25%. Additional weight and/or footprint reductions can be obtained by using other common modules to service the two aperture ESA.

Figure 4:
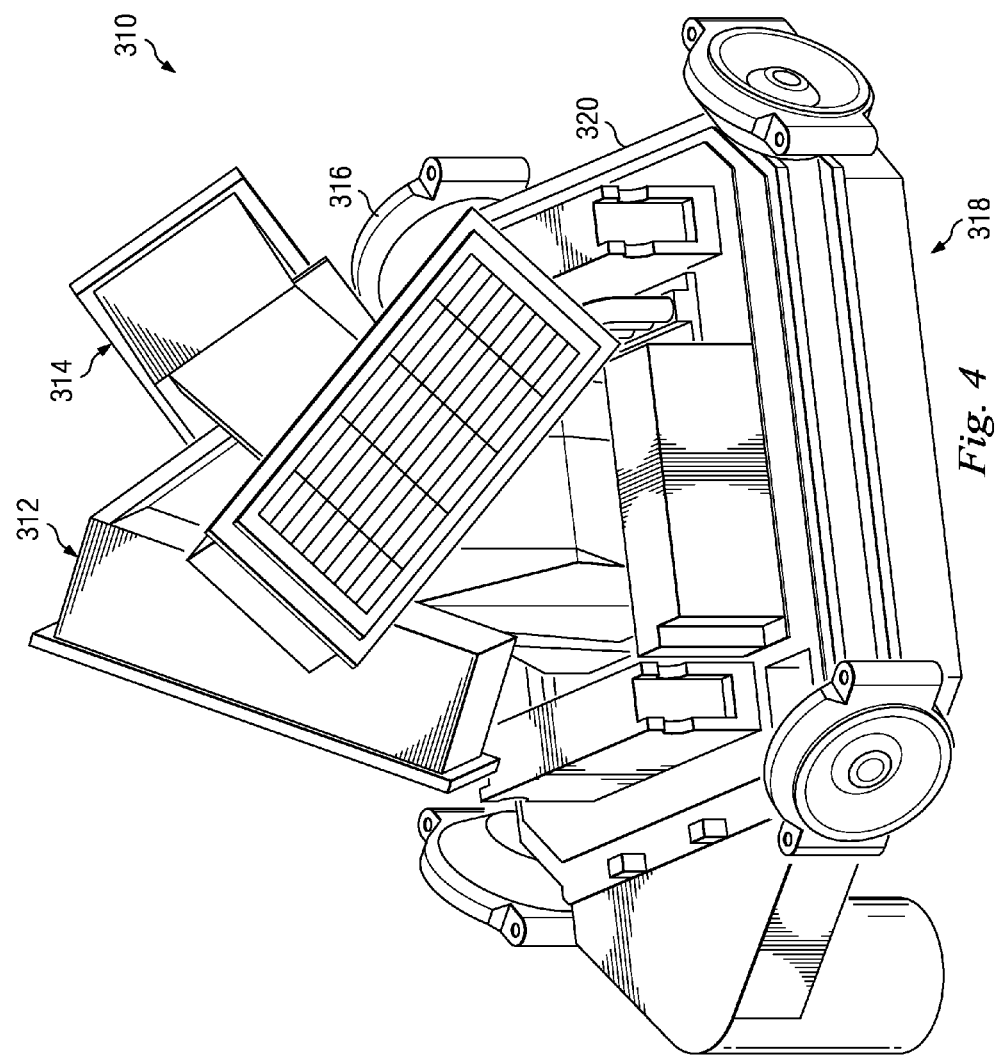
FIG. 4 is a perspective view of a three aperture ESA system according to another embodiment of the present disclosure.

FIG. 4 is a perspective view of a three aperture ESA system 310 that includes three ESA assemblies 312, 314, 316 which may be substantially similar to the described ESA assemblies 102, 104. With three ESA assemblies, the system 310 can be arranged to scan adjacent, overlapping, or nonadjacent fields of view. The ESA assemblies 312, 314, 316 share a common manifold 318 that provides any or all of the shared resources described above for manifold 128. In this embodiment, an air cooled coldplate 320 is used to dissipate heat generated by the components coupled to the manifold 320, including the ESA assemblies 312, 314, 316. As compared to three ESAs, each with a dedicated RF module, a three aperture ESA system with a common RF module may have a weight reduction of approximately 33%. Additional weight and/or footprint reductions can be obtained by using other common modules to service the three aperture ESA.

Figure 5:
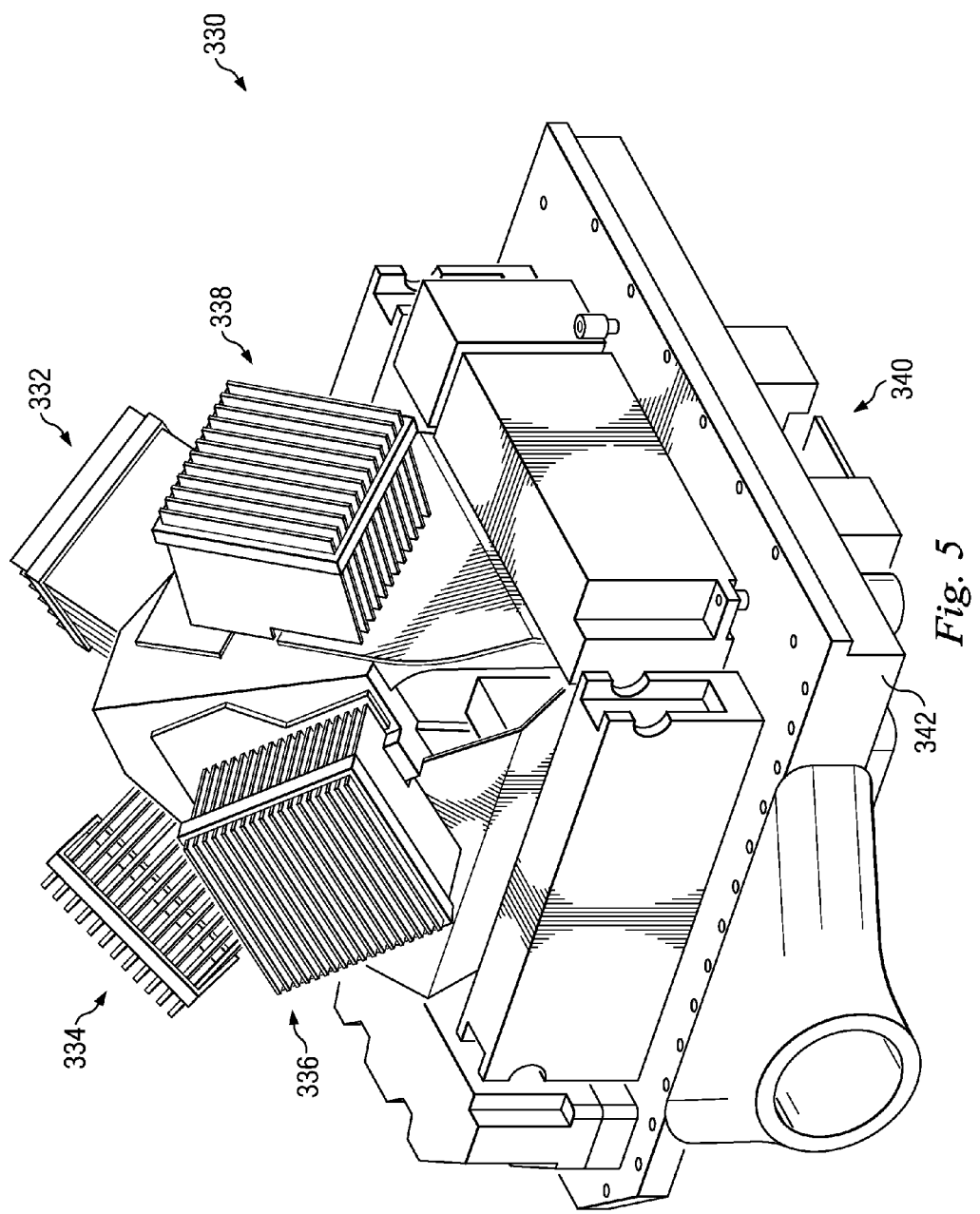
FIG. 5 is a perspective view of a four aperture ESA system according to another embodiment of a present disclosure.

FIG. 5 is a perspective view of a four aperture ESA system 330 that includes four ESA assemblies 332, 334, 336, 338 which may be substantially similar to the described ESA assemblies 102, 104. With four ESA assemblies, the system 330 can be arranged to scan adjacent, overlapping, or nonadjacent fields of view. The ESA assemblies 332, 334, 336, 338 share a common manifold 340 that provides any or all of the shared resources described above for manifold 128. In this embodiment, an air cooled coldplate 342 is used to dissipate heat generated by the components coupled to the manifold 340, including the ESA assemblies 332, 334, 336, 338. As compared to four ESAs, each with a dedicated RF module, a four aperture ESA system with a common RF module may have a weight reduction of approximately 38%. Additional weight and/or footprint reductions can be obtained by using other common modules to service the four aperture ESA.

Although 2, 3 and 4 aperture ESA systems have been described, it is understood that ESA systems may be configured to include more apertures that share common resources provided by a single manifold support system. Further, as shown in FIGS. 3-5, the ESA assemblies may have different shapes and sizes. In alternative embodiments, ESA assemblies supported by a common manifold may have different shapes, sizes, capabilities, angles of deployment, and proximities to the manifold system. This may allow the common manifold to serve as a modular unit capable of supporting different modular front end ESA assemblies. Thus, the configuration of the ESA system may be more versatile and tailored for specific vehicles or applications. Because the ESA assemblies supported by a common manifold may or may not be identical, lower performance ESA assemblies (with lower cost, weight, size, and power requirements) may be directed toward lower threat zone areas. As compared to single aperture ESA systems with dedicated support systems, the multi-aperture ESA system may require less installation space and interconnect cabling.

Figure 6:
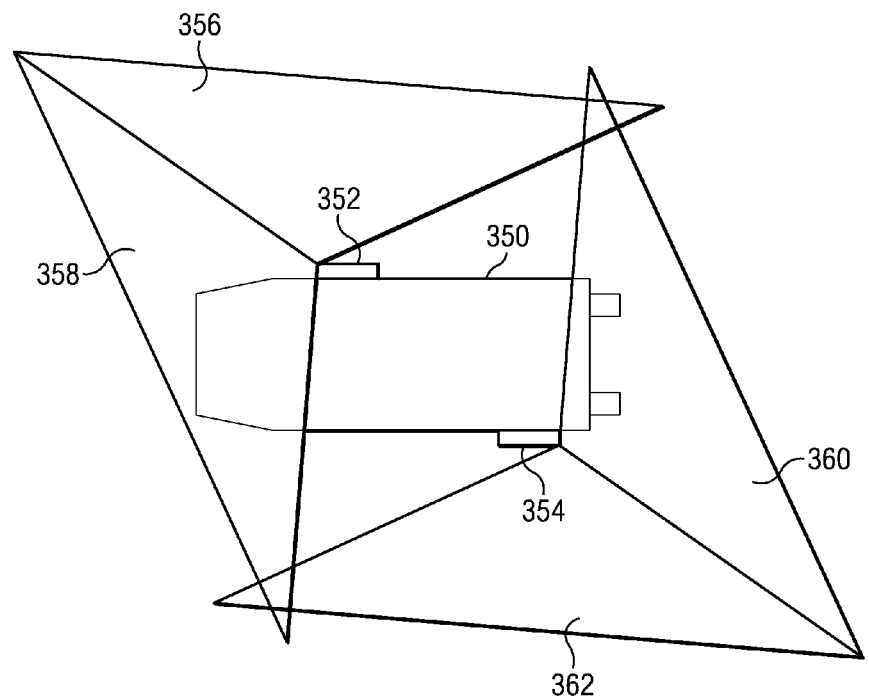
FIG. 6 is a field of view map associated with a pair of two aperture ESA systems implemented on a ground vehicle.

FIG. 6 is a field of view map showing the top view of an armored ground vehicle 350 fitted with a two aperture ESA system 352 and a two aperture ESA system 354. The ESA systems may be substantially similar to the ESA systems 100 or 300 described above. The ESA system 352 has two ESA assemblies which provide the ESA system with a field of view 356 and a field of view 358. The ESA system 354 has two ESA assemblies which provide the ESA system with a field of view 360 and a field of view 362. Thus, with two manifold support systems, one for each ESA system 352, 354, an effective 360° field of view may be obtained around the vehicle 350. Because two fields of view are serviced by a one manifold system, the weight, space, and cost associated with the ESA systems 352, 354 may be reduced compared to ESA systems with dedicated resources to support each of the generated fields of view. Furthermore, the handoff from one aperture to another aperture may be controlled more easily when a common control system in the shared manifold is used to operate multiple ESA assemblies. Generally, the coverage and proximity of multiple apertures may minimize close-in blind zones and parallax effects.

Figure 7:
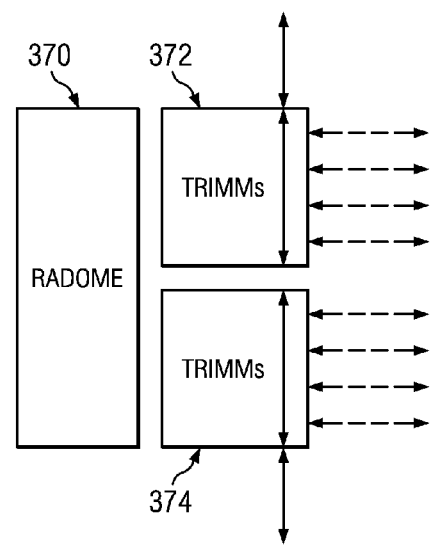
FIG. 7 is a partial schematic view of a multi-aperture ESA system with a shared radome.

FIG. 7 is a partial schematic view of a multi-aperture ESA system with a shared radome. The ESA system may be substantially similar to the ESA system 100 except that instead of separate radomes for each ESA assembly, as shown with system 100, the ESA system of FIG. 7 has a single radome 370 sized to fully or partially enclose ESA assemblies 372, 374 to minimize transmission loss for electromagnetic signals while providing suitable ballistic and environmental protection for electronics transmitting or receiving electromagnetic signals.

The foregoing outlines features of selected embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. An electronically scanned array (ESA) system comprising:
   a first ESA assembly including a first antenna system coupled to a first plurality of transmit/receive modules, the first antenna system is configured as a first aperture;
   a second ESA assembly including a second antenna system coupled to a second plurality of transmit/receive modules, the second antenna system is configured as a second aperture that is different from the first aperture;
   a manifold system coupled to the first and second ESA assemblies, the manifold system including an RF signal processing system configured to receive signals from the first and second ESA assemblies and transmit signals to the first and second ESA assemblies; and
   an electronic beam steering system communicatively coupled to each of the first and second ESA assemblies, wherein the electronic beam steering system is configured to control beam formation and electronic beam scanning for the first and second apertures, wherein the electronic beam steering system is configured to apply weights to signals of the first and second plurality of transmit/receive modules to control a direction of beams produced by the first and second ESA assemblies; and a switch matrix disposed between the first and second ESA assemblies and the manifold system, wherein the switch matrix includes a first switching configuration to couple the first ESA assembly to the electronic beam steering system and a second switching configuration to couple the second ESA assembly to the electronic beam steering system.

2. The ESA system of claim 1 wherein the manifold system includes a power supply system to supply power to the first and second ESA assemblies.

3. The ESA system of claim 1 wherein the manifold system includes a cooling system for cooling the first and second ESA assemblies.

4. The ESA system of claim 1 wherein the manifold system includes a processor for processing data received from the first and second ESA assemblies.

5. The ESA system of claim 1 wherein the manifold system includes digital pre-processor firmware.

6. The ESA system of claim 1 wherein the manifold system includes an inertial measurement unit.

7. The ESA system of claim 1 wherein the manifold system includes a shock mounting assembly.

8. The ESA system of claim 1 wherein the manifold system includes a modulator.

9. The ESA system of claim 1 wherein the manifold system includes a frequency converter.

10. The ESA system of claim 1 comprising a first radome sized to enclose the first ESA assembly and a second radome sized to enclose the second ESA assembly.

11. The ESA system of claim 1 comprising a radome sized to enclose the first and second ESA assemblies.

12. The ESA system of claim 1 wherein the first and second ESA assemblies include first and second RF collectors, respectively.

13. The ESA system of claim 1 wherein the first and second plurality of transmit/receive modules are transmit/receive integrated microwave modules.

14. A method of operating an electronically scanned array (ESA) system comprising:
providing a first ESA assembly including a first antenna system coupled to a first plurality of transmit/receive modules, the first antenna system defining a first aperture;
providing a second ESA assembly including a second antenna system coupled to a second plurality of transmit/receive modules, the second antenna system defining a second aperture that is different from the first aperture;
processing information received from the first and second ESA assemblies with a common signal processing system supported by a manifold housing;
controlling beam formation and electronic beam scanning for ESA by an electronic beam steering system communicatively coupled to each of the first and second ESA assemblies and supported by the manifold housing, wherein the electronic beam steering system controls beam formation and electronic beam scanning for the first and second apertures, and wherein the electronic beam steering system applies weights to signals of the first and second plurality of transmit/receive modules to control a direction of beams produced by the first and second apertures; and
controlling beam formation for the first and second ESA assemblies with a switch matrix disposed between the first and second ESA assemblies and the manifold system, wherein the switch matrix includes a first switching configuration to couple the first ESA assembly to the electronic beam steering system and a second switching configuration to couple the second ESA assembly to the electronic beam steering system.

15. The method of operating an ESA system of claim 14 further comprising:
providing power to the first and second ESA assemblies from a power assembly supported by the manifold housing.

16. The method of operating an ESA system of claim 14 further comprising:
cooling the manifold housing with fluid.

17. The ESA system of claim 1 wherein:
the manifold system provides the first switching configuration to couple the first ESA assembly to the RF signal processing system of the manifold system and the second switching configuration to couple the second ESA assembly to the RF signal processing system of the manifold system.

18. An antenna system comprising:
a first AESA assembly having a first plurality of antenna elements coupled to a first plurality of transmit/receive (T/R) modules, the first AESA assembly configured as a first aperture;
a second AESA assembly having a second plurality of antenna elements coupled to a second plurality of transmit/receive (T/R) modules, the second AESA assembly configured as a second aperture that is different from the first aperture;
a manifold system including one or more subsystems for supporting transmit and/or receive operations associated with both the first AESA assembly and the second AESA assembly;
an electronic beam steering system communicatively coupled to each of the first and second ESA assemblies, wherein the electronic beam steering system is configured for controlling beam formation and electronic beam scanning for ESA, wherein the electronic beam steering system is configured to apply weights to signals of the first and second plurality of transmit/receive modules to control beam formation and electronic beam scanning for both the first and second apertures; and
a switch matrix disposed between the first and second ESA assemblies and the manifold system, wherein the switch matrix includes a first switching configuration to couple the first ESA assembly to the electronic beam steering system and a second switching configuration to couple the second ESA assembly to the electronic beam steering system.

* * * * *